(12) United States Patent
Ochsner et al.

(10) Patent No.: US 8,745,976 B2
(45) Date of Patent: Jun. 10, 2014

(54) DEVICE FOR COOLING AN EXHAUST GAS STREAM

(75) Inventors: Scott D. Ochsner, Cedar Falls, IA (US); Romain Brunet, Mannheim (DE)

(73) Assignee: Deere & Company, Moline, IL (US)

( * ) Notice: Subject to any disclaimer, the term of this patent is extended or adjusted under 35 U.S.C. 154(b) by 259 days.

(21) Appl. No.: 12/900,122

(22) Filed: Oct. 7, 2010

(65) Prior Publication Data

US 2011/0239637 A1    Oct. 6, 2011

(30) Foreign Application Priority Data

Oct. 19, 2009    (DE) .................. 10 2009 045 801

(51) Int. Cl.
*F01N 5/04* (2006.01)
*F01N 5/02* (2006.01)
*F01N 1/00* (2006.01)

(52) U.S. Cl.
USPC .................................. 60/319; 60/320; 60/324

(58) Field of Classification Search
USPC ................. 60/298, 316, 317, 319, 320, 324
See application file for complete search history.

(56) References Cited

U.S. PATENT DOCUMENTS

| 2,829,731 | A | * | 4/1958 | Clayton | 423/212 |
| 3,022,934 | A | * | 2/1962 | Gerald | 417/168 |
| 3,186,511 | A | * | 6/1965 | Kliewer, Sr. | 181/259 |
| 4,418,532 | A | * | 12/1983 | Momose et al. | 60/316 |
| 4,872,308 | A | * | 10/1989 | Nagai et al. | 60/316 |

FOREIGN PATENT DOCUMENTS

WO    2008/060559    11/2007

* cited by examiner

*Primary Examiner* — Thomas Denion
*Assistant Examiner* — Diem Tran

(57) ABSTRACT

A device for cooling an exhaust gas stream, having an exhaust gas pipe receiving the exhaust gas stream, the exhaust gas pipe being surrounded at least in places by a heat shield arranged spaced therefrom, which together with the outside of the exhaust gas pipe forms a convection region for air supplied from the surrounding environment. A mouth region of the exhaust gas pipe extended relative to the heat shield projects in such a way into an open end of an adjoining outlet port that a reduced pressure relative to the surrounding environment may be produced in a suction region between the mouth region of the exhaust gas pipe and the outlet port as the air heated in the convection region due to the exhaust gas stream rises.

13 Claims, 2 Drawing Sheets

DEVICE FOR COOLING AN EXHAUST GAS STREAM

FIELD OF THE DISCLOSURE

This disclosure relates to a device for cooling an exhaust gas stream, having an exhaust gas pipe receiving the exhaust gas stream, the exhaust gas pipe being surrounded at least in places by a heat shield arranged spaced therefrom, which together with the outside of the exhaust gas pipe forms a convection region for air supplied from the surrounding environment.

BACKGROUND OF THE DISCLOSURE

Exhaust gas systems consisting of an exhaust gas pipe for discharging an exhaust gas stream emerging from a diesel engine and a heat shield in the form of a tubular cover arranged spacedly, on the outside of the exhaust gas pipe, are known inter alia from the 6030 Series agricultural tractors made by John Deere.

The exhaust gas standards enacted by the European Union provide for a gradual reduction in the soot particles produced by diesel engines and discharged into the environment with the engine exhaust gas. Soot particle discharge is restricted by using soot particle filters, as a rule with "wall-flow filters," in which the engine exhaust gas passes through a porous filter wall of a ceramic or metallic material. As a result, the soot particles contained in the engine exhaust gas become deposited both on the surface of and also inside the filter wall such that the exhaust gas back-pressure increases as the degree of clogging of the filter wall increases. To regenerate the soot particle filter, the deposited soot particles are burned at regular intervals, for which purpose the temperature of the engine exhaust gas is increased from time to time to temperatures of over 500° C., for example by means of an oxidation catalytic converter connected upstream of the soot particle filter. During regeneration, correspondingly high exhaust gas temperatures may occur at the exhaust tail pipe of the exhaust gas system, which lead under certain circumstances to the formation of undesirable nitrogen oxides.

Against this background, WO 2008/060559 A2 discloses a device for reducing the exhaust gas temperature at an exhaust tail pipe. The device, which may be fitted to the exhaust tail pipe by means of a clip or clamp, comprises a nozzle, which is fitted by means of a plurality of radially arranged holding struts in such a way on an adjoining diverter housing that, on passage of the exhaust gas stream, a partial vacuum for drawing in cooler ambient air may be produced in an inlet formed between the nozzle and the diverter housing. However, the shape of the nozzle or of the diverter housing, which shape tapers in the passage direction of the exhaust gas stream, leads to an undesired increase in the exhaust gas back-pressure in the exhaust gas system.

It is therefore the object of the present invention to provide a device of the above-mentioned type which enables cooling of an exhaust gas stream emerging in particular from a diesel particle filter without undesirably increasing the exhaust gas back-pressure in the region of an exhaust tail pipe.

SUMMARY OF THE DISCLOSURE

The device according to the invention for cooling an exhaust gas stream comprises an exhaust gas pipe receiving the exhaust gas stream, the exhaust gas pipe being surrounded at least in places by a heat shield arranged spaced therefrom, which together with the outside of the exhaust gas pipe forms a convection region for air supplied from the surrounding environment. A mouth region of the exhaust gas pipe extended relative to the heat shield projects in such a way into an open end of an adjoining outlet port that a reduced pressure relative to the surrounding environment may be produced in a suction region between the mouth region of the exhaust gas pipe and the outlet port as the air heated in the convection is region due to the exhaust gas stream rises. More precisely, the mouth region, surrounded by the heat shield, of the exhaust gas pipe forms a nozzle interacting with the outlet port in such a way that a reduced pressure is brought about in the suction region as a result of the Venturi effect as the air heated in the convection region rises. Since the nozzle is arranged outside the exhaust gas stream, an undesired increase in the exhaust gas back-pressure in the region of the exhaust tail pipe may be avoided. The ambient air drawn into the outlet port due to the reduced pressure leads in the process, depending on the temperature thereof, to corresponding cooling of the exhaust gas stream emerging at the outlet port and thus at the exhaust tail pipe.

The exhaust gas pipe preferably has a vertically oriented profile at least in the mouth region, so as to encourage the heated air to rise in the convection region. The exhaust gas pipe may for example be a component of an exhaust gas system of an agricultural utility vehicle in the form of a tractor.

It is additionally feasible for the suction region to take the form of a first annular gap extending radially between the outlet port and the exhaust gas pipe and/or for the convection region to take the form of a second annular gap extending radially between the heat shield and the exhaust gas pipe. Accordingly, the exhaust gas pipe, the heat shield and the outlet port have a substantially circular cross section at least in the mouth region of the exhaust gas pipe. In this respect, a concentric arrangement of the is heat shield and of the outlet port relative to the mouth region of the exhaust gas pipe is preferred.

In the mouth region of the exhaust gas pipe, the first annular gap may have an external diameter matching the second annular gap or smaller than the latter. The narrowing formed in the latter case between the first and second annular gaps results in a reinforcement of the Venturi effect and thus in an increase in the reduced pressure in the suction region.

Preferably, the outlet port is arranged spaced from the heat shield in such a way that opposing end regions of the outlet port and of the heat shield form an annular suction opening connected with the suction region. The suction region may here be surrounded by a filter element, in particular by a perforated mesh. The openings in the perforated mesh are dimensioned such that above all relatively coarse contaminants, which would lead rapidly to clogging or blocking of the suction region, are reliably retained.

To ensure the lowest possible exhaust gas back-pressure, the exhaust gas pipe may have an internal diameter which remains the same over the length of the mouth region. The exhaust gas pipe is in particular made from a seamless drawn steel pipe with a smooth wall on both sides.

It is furthermore possible for the heat shield to comprise over its circumference a plurality of air supply openings leading into the convection region, such that a continuous supply of air from the surrounding environment is guaranteed. The air supply openings may here take the form of inlet slits distributed over the circumference of the heat shield.

The device will be described in greater detail below with reference to the appended drawings, in which components of matching or comparable function are labelled with the same reference numerals.

DETAILED DESCRIPTION OF THE DRAWINGS

Figure 1:
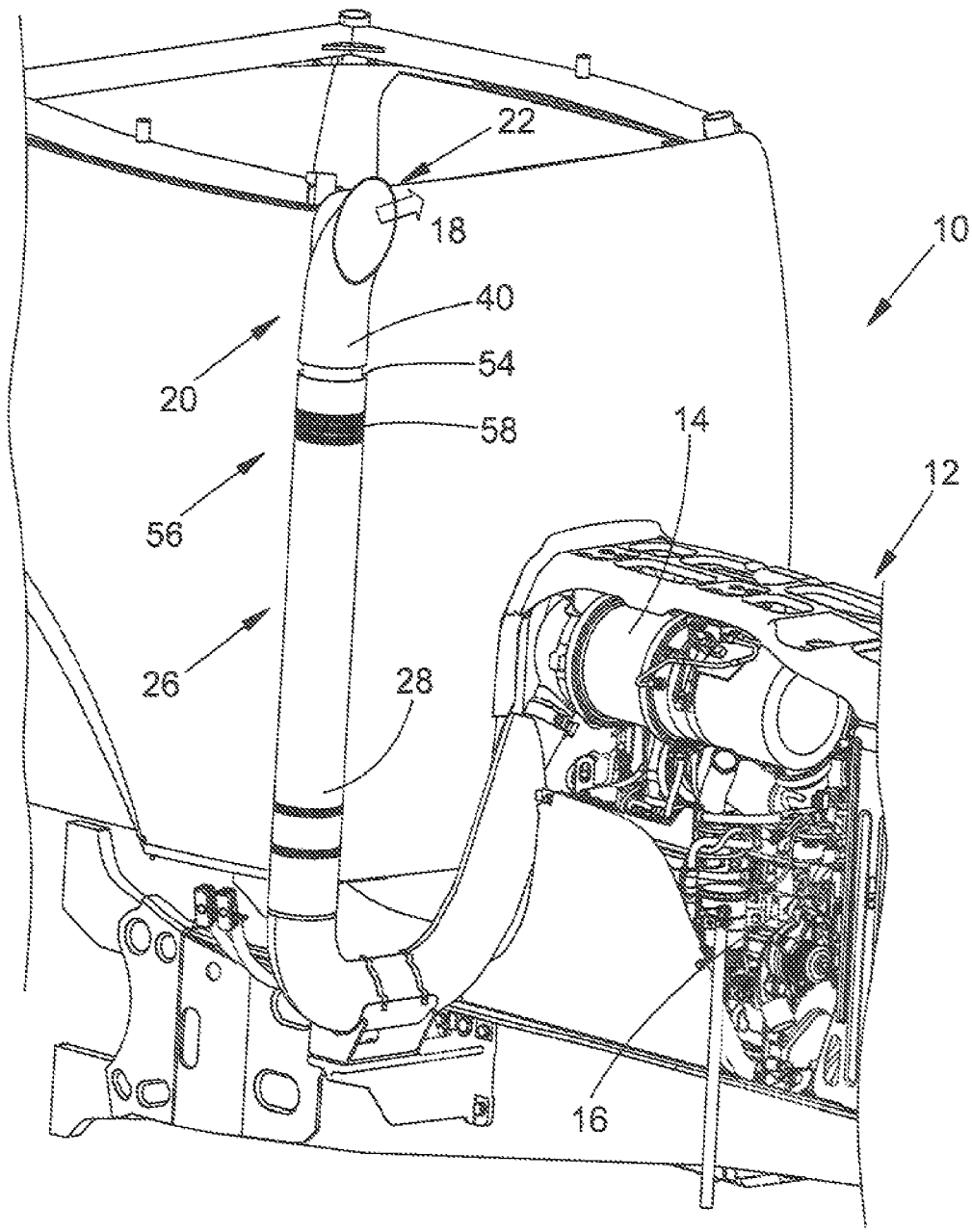
FIG. 1 shows an exemplary embodiment of the device for cooling an exhaust gas stream on an agricultural utility vehicle.

The agricultural utility vehicle 10 comprises a soot particle filter 14 accommodated in an engine compartment 12, wherein said soot particle filter takes the form of a conventional wall-flow filter, the engine exhaust gas produced by a diesel engine 16 of the agricultural utility vehicle 10 passing through a porous filter wall of a ceramic or metallic material. In the process, the soot particles contained in the engine exhaust gas become deposited both on the surface of and also inside the filter wall of the soot particle filter 14. Since the exhaust gas back-pressure increases as the degree of clogging of the filter wall increases, the deposited soot particles are burned at regular intervals to regenerate the soot particle filter 14, for which purpose the temperature of the engine exhaust gas is increased from time to time to temperatures of over 500° C. using an oxidation catalytic converter connected upstream of the soot particle filter 14.

To cool the exhaust gas stream 18 emerging from the soot particle filter 14, the device 22 provided in the region of an exhaust tail pipe 20 comprises an exhaust gas pipe 24 receiving the exhaust gas stream 18, the exhaust gas pipe 24 being surrounded at least along a portion extending outside the engine compartment 12 of the agricultural utility vehicle 10 by a spacedly arranged heat shield 26 in the form of a tubular cover 28, which heat shield forms, together with the outside of the exhaust gas pipe 24, a convection region 30 for air 34 supplied from the surrounding environment 32. A mouth region 36 of the exhaust gas pipe 24 extended relative to the heat shield 26 projects in such a way into an open end 38 of an adjoining outlet port 40 that a reduced pressure relative to the surrounding environment 32 may be produced in a suction region 42 between the mouth region 36 of the exhaust gas pipe 24 and the outlet port 40 as the air 34 heated in the convection region 30 due to the exhaust gas stream 18 rises.

More precisely, the mouth region 36, surrounded by the heat shield 26, of the exhaust gas pipe 24 forms a nozzle interacting with the outlet port 40 in such a way that a reduced pressure is brought about in the suction region 42 as a result of the Venturi effect as the air 34 heated in the convection region 30 rises. The ambient air 44 drawn into the outlet port 40 due to the reduced pressure leads in the process, depending on the temperature thereof, to corresponding cooling of the exhaust gas stream 18 emerging at the outlet port 40.

The exhaust gas pipe 24 has a vertically oriented profile at least in the mouth region 36, so as to encourage the heated air 34 to rise in the convection region 30.

Figure 2:
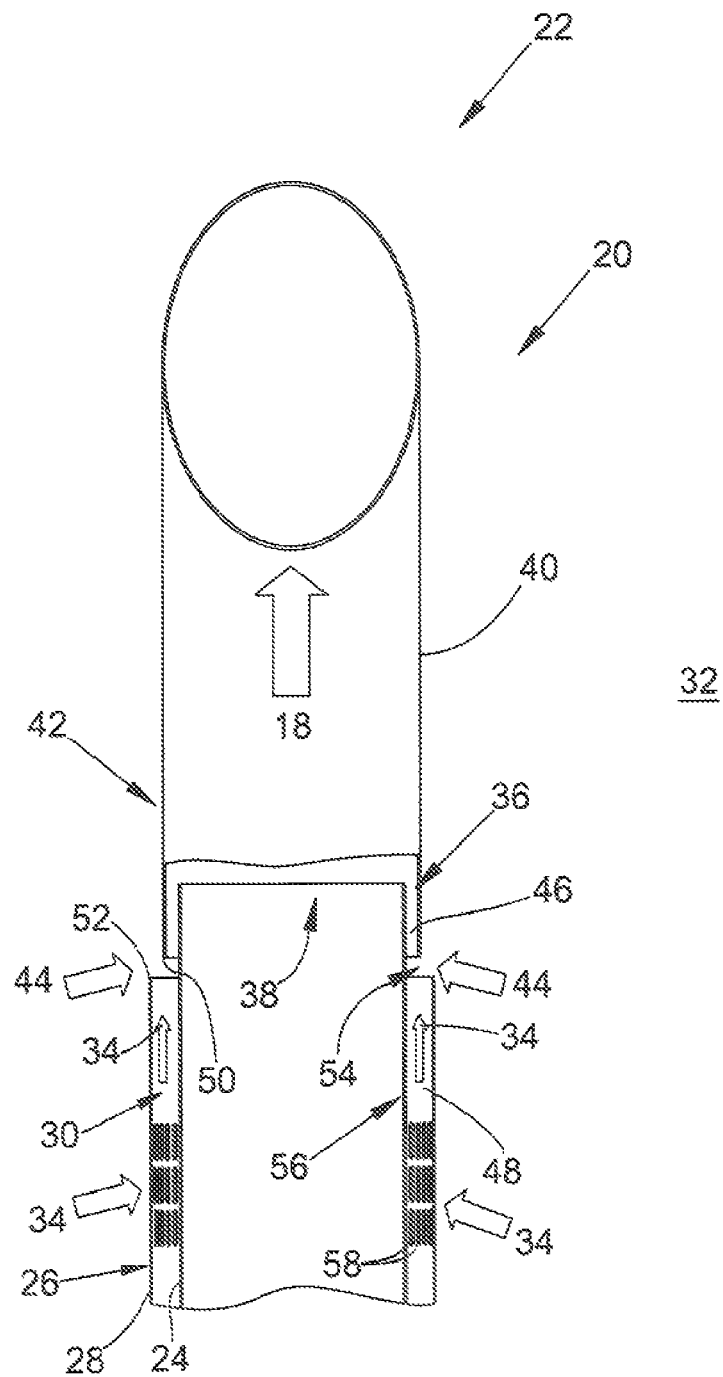
FIG. 2 is a detail view of the exemplary embodiment shown in FIG. 1 of the device in longitudinal section.

As is most clearly visible in FIG. 2, the suction region 42 takes the form of a first annular gap 46 extending radially between the outlet port 40 and the exhaust gas pipe 24 and/or the convection region 30 takes the form of a second annular gap 48 extending radially between the heat shield 26 and the exhaust gas pipe 24. Accordingly, the exhaust gas pipe 24, the heat shield 26 and the outlet port 40 have a substantially circular cross section at least in the mouth region 36 of the exhaust gas pipe 24. In this case, the heat shield 26 and the outlet port 40 are arranged concentrically relative to the mouth region 36 of the exhaust gas pipe 24. Both the outlet port 40 and the heat shield 26 are here attached to the outside of the exhaust gas pipe 24 by means of radially arranged spacers, not shown.

By way of example, the first annular gap 46 in the mouth region 36 of the exhaust gas pipe 24 has an external diameter smaller than the second annular gap 48. The narrowing formed in this way between the first and second annular gaps 46 and 48 results in a reinforcement of the Venturi effect and thus in an increase in the reduced pressure in the suction region 42. It is alternatively possible for the first annular gap 46 in the mouth region 36 of the exhaust gas pipe 24 to have an external diameter matching the second annular gap 48.

The outlet port 40 is arranged spaced from the heat shield 26 in such a way that opposing end regions 50 and 52 of the outlet port 40 and of the heat shield 26 form an annular suction opening 54 connected with the suction region 42. The suction region 42 may here be surrounded by a filter element, not shown, in the form of a perforated mesh. The openings in the perforated mesh are dimensioned such that above all relatively coarse contaminants, which would lead rapidly to clogging or blocking of the suction region 42, are reliably retained.

To ensure the lowest possible exhaust gas back-pressure, the exhaust gas pipe 24 has an internal diameter which remains the same over the mouth region 36. The exhaust gas pipe 24 is here made from a seamless drawn steel pipe with a smooth wall on both sides.

In addition, the heat shield 26 comprises over its circumference a plurality of air supply openings 56 leading into the convection region 30. The air supply openings 56 take the form of inlet slits 58 distributed over the circumference of the heat shield 26, said inlet slits being located in the present case in a plurality of superposed rows below the annular suction opening 54.

Although the agricultural utility vehicle 10 shown in FIG. 1 is, by way of example, a tractor, it is likewise feasible for the device 22 to be used with any other desired diesel-engined motor vehicles. In addition, it may also be used in stationary applications, such as for example a diesel-engined power generator or the like.

While the disclosure has been illustrated and described in detail in the drawings and foregoing description, such illustration and description is to be considered as exemplary and not restrictive in character, it being is understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A device for cooling an exhaust gas stream, having an exhaust gas pipe receiving the exhaust gas stream, an outer diametrical surface of the exhaust gas pipe being surrounded at least in places radially outward by a heat shield arranged spaced therefrom, which together with the outside of the exhaust gas pipe forms a convection region for an ambient air supplied, at atmospheric pressure, from the surrounding environment, characterized in that a mouth region of the exhaust gas pipe, extended relative to the heat shield, projects in such a way into an open end of an adjoining outlet port that a reduced pressure relative to the surrounding environment is produced in a suction region between the mouth region of the exhaust gas pipe and the outlet port as the ambient air heated in the convection region due to the exhaust gas stream rises, the outlet port being positioned downstream of the heat shield and overlapping the exhaust gas pipe, the exhaust gas pipe having an internal diameter remaining the same over the mouth region, and the outlet port is arranged axially spaced from the heat shield in such a way that opposing end regions of the outlet port and of the heat shield form an annular suction opening connected with the suction region.

2. The device of claim 1, wherein the exhaust gas pipe has a vertically oriented profile at least in the mouth region.

3. The device of claim 1, wherein the heat shield comprises a plurality of ambient air supply openings over its circumference leading into the convection region, the plurality of ambient air supply openings configured to receive ambient air from outside of the heat shield so as to cool the exhaust gas pipe.

4. The device of claim 1, wherein the suction region takes the form of a first annular gap extending radially between the outlet port and the exhaust gas pipe, the convection region takes the form of a second annular gap extending radially between the heat shield and the exhaust gas pipe, and the suction region and the convection region both overlap the exhaust gas pipe.

5. The device of claim 4, wherein in the mouth region of the exhaust gas pipe, the first annular gap has an external diameter matching the second annular gap or smaller than the latter.

6. The device of claim 4, wherein the first annular gap forms an annular gap cylinder.

7. The device of claim 4, wherein the second annular gap forms a second annular gap cylinder.

8. A device for cooling an exhaust gas stream, having an exhaust gas pipe receiving the exhaust gas stream, an outer diametrical surface of the exhaust gas pipe being surrounded at least in places radially outward by a heat shield arranged spaced therefrom, which together with the outside of the exhaust gas pipe forms a convection region for an ambient air supplied, at atmospheric pressure, from the surrounding environment, characterized in that a mouth region of the exhaust gas pipe, extended relative to the heat shield, projects in such a way into an open end of an adjoining outlet port that a reduced pressure relative to the surrounding environment is produced in a suction region between the mouth region of the exhaust gas pipe and the outlet port as the ambient air heated in the convection region due to the exhaust gas stream rises, and the ambient air and the heated air mixing prior to mixing with the exhaust gas stream.

9. The device of claim 8, wherein the exhaust gas pipe has a vertically oriented profile at least in the mouth region.

10. The device of claim 8, wherein the outlet port is arranged axially spaced from the heat shield in such a way that opposing end regions of the outlet port and of the heat shield form an annular suction opening connected with the suction region.

11. The device of claim 8, wherein the heat shield comprises a plurality of ambient air supply openings over its circumference leading into the convection region, the plurality of ambient air supply openings configured to receive ambient from outside of the heat shield so as to cool the exhaust gas pipe.

12. The device of claim 8, wherein the suction region takes the form of a first annular gap extending radially between the outlet port and the exhaust gas pipe, the convection region takes the form of a second annular gap extending radially between the heat shield and the exhaust gas pipe, and the suction region and the convection region both overlap the exhaust gas pipe.

13. The device of claim 12, wherein in the mouth region of the exhaust gas pipe, the first annular gap has an external diameter matching the second annular gap or smaller than the latter.

* * * * *